(12) United States Patent
Edamadaka et al.

(10) Patent No.: US 7,949,118 B1
(45) Date of Patent: May 24, 2011

(54) METHODS AND APPARATUS FOR PROCESSING A SESSION

(75) Inventors: Rajeshwari Edamadaka, Allentown, NJ (US); Timothy Ian Ross, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1252 days.

(21) Appl. No.: 11/584,260

(22) Filed: Oct. 19, 2006

(51) Int. Cl.
*H04M 3/42* (2006.01)
(52) U.S. Cl. .................. 379/202.01; 370/260; 715/230; 715/232
(58) Field of Classification Search .......... 370/260–265; 379/202.01–205.01; 715/201–277
See application file for complete search history.

(56) References Cited

U.S. PATENT DOCUMENTS

| | | | | |
|---|---|---|---|---|
| 5,195,086 | A * | 3/1993 | Baumgartner et al. | 370/264 |
| 5,550,965 | A * | 8/1996 | Gabbe et al. | 715/209 |
| 5,559,875 | A * | 9/1996 | Bieselin et al. | 379/202.01 |
| 5,729,687 | A * | 3/1998 | Rothrock et al. | 709/204 |
| 5,764,902 | A * | 6/1998 | Rothrock | 709/205 |
| 6,119,147 | A * | 9/2000 | Toomey et al. | 709/204 |
| 6,823,050 | B2 * | 11/2004 | Brown et al. | 379/93.21 |
| 7,039,585 | B2 * | 5/2006 | Wilmot et al. | 704/235 |
| 7,558,221 | B2 * | 7/2009 | Nelson et al. | 370/260 |
| 2003/0158900 | A1 * | 8/2003 | Santos | 709/205 |
| 2006/0288273 | A1 * | 12/2006 | Erol et al. | 715/512 |

* cited by examiner

*Primary Examiner* — Simon Sing
*Assistant Examiner* — Assad Mohammed
(74) *Attorney, Agent, or Firm* — Chapin IP Law, LLC; David W. Rouille, Esq.

(57) ABSTRACT

A system records a session on a medium, and differentiates the content of the session into a plurality of sub content sessions. The system indexes the plurality of sub content sessions associated with the session, and allows retrieval of at least one of the plurality of sub content session based on the indexing. The system provides a review of the session.

19 Claims, 11 Drawing Sheets

Personalized Enhanced Conferencing - review

130 ↓

- [Global] Eric : Speaker begin : t+5 seconds:
  - App URL (http://www.avaya.com)
- [Personal] Eric : Book Mark : t+15 seconds
- [Global] John : Speaker Begin : t+25 seconds
- [Global] Lydia : Speaker Begin: t+35 seconds
- [Personal] Eric : Marked Section (Begin and End) : t+45 seconds; Duratn 15 seconds
- [Personal] Eric : Annotate wText: t+55 seconds; Duration 15 seconds
  - See Text Annotation
- [Personal] Lydia : Annotate wVoice: t+55 seconds; Duration 15 seconds
  - Play Voice Annotation

- Actions

- Delete      Mark      <<Frwd      >>Rewnd      Bookmark

*FIG. 4*

221 ALLOW RETRIEVAL OF AT LEAST ONE OF THE PLURALITY OF SUB CONTENT SESSION BASED ON THE INDEXING

222 RECEIVE A REQUEST TO RETRIEVE AT LEAST ONE OF THE PLURALITY OF SUB CONTENT SESSION FROM A SESSION SERVER

↓

223 TRANSMIT A COPY OF THE AT LEAST ONE OF THE PLURALITY OF SUB CONTENT SESSION FROM THE SESSION SERVER FOR DISPLAY TO AT LEAST ONE USER

OR

224 RECEIVE AT LEAST ONE OF THE PLURALITY OF SUB CONTENT SESSION AT A SESSION SERVER, THE AT LEAST ONE OF THE PLURALITY OF SUB CONTENT SESSION IDENTIFIED AS A GLOBAL SUB CONTENT SESSION

↓

225 PROPAGATE THE GLOBAL SUB CONTENT SESSION TO AT LEAST ONE USER IDENTIFIED AS A RECIPIENT OF THE GLOBAL SUB CONTENT SESSION

*FIG. 10*

METHODS AND APPARATUS FOR PROCESSING A SESSION

BACKGROUND

Conventional computerized devices, such as personal computers, laptop computers, telephones, and the like, allow people to communicate via telephone, teleconferencing, videoconferencing, etc. It may be advantageous to record the content of these sessions for evaluation, analysis, review, archival, etc. For example, meetings may be recorded with an audio or videotape for review at a later time, or call centers may record communications between call center employees and customers to evaluate performance of the call center employees, or to assess customer satisfaction of the customers. In some instances there is a mix of different media that is used (i.e., a conference call where the presenters speak throughout the call, but also share Power point applications o the rest of the attendees.

The content of the sessions can be logged in a variety of ways including writing minutes of the session, recording a session via a tape recorder, video recorder, etc. Transcripts of the sessions can be produced by voice recognition software or even by transcription of voice to written form. Once transcribed into written form (i.e., a document), users can add additional content to the sessions by adding annotations to the document.

SUMMARY

Conventional technologies for managing the content of a session suffer from a variety of deficiencies. In particular, conventional technologies for managing the content of a session (i.e., processing session information during and after the session/meeting is completed) are limited in that they do not provide a simple and thorough method for users to access, book mark and annotate the content, at the time of conference (in real time) or during review (post-call). During sessions involving a group of users, it may be difficult to differentiate what each user has said, and attribute that contribution to the correct user. In the example of a tape-recorded or video recorded session, it is difficult to find a section of a session that is of interest to a particular user. Attempting to fast forward/rewind through a session is laborious, especially when the session is lengthy. A user attempting to review the session may not know in which order the attendees of the session spoke, and the user may have to listen to the entire session. This is very inconvenient, if not nearly impossible, for long conferences. While a user may review a tape-recorded session and make additional annotations to the session, those annotations are not part of the tape-recorded session and have to be recorded in some other manner (i.e., in written form, or recorded in audio format on a different tape, or on the same tape on which the original session occurred, but on a different portion on the tape). There is no elegant way to automatically attach, and store the annotations along with the tape-recorded message. Conventional technologies do not allow a user to add comments or annotations to a session during the session, and specify those annotations as for the user's personal use or for global use of all users having access to the session (both during and after the session). Each user has his or her own perspective of important points and notes; and these may be different from another listener's perspective.

Embodiments disclosed herein significantly overcome such deficiencies and provide a system that includes a computer system executing a session managing process that allows a user to bookmark and annotate a session both during and after the recording of the session. The session managing process also stores the session, bookmarks and annotations together for easy retrieval. During a session, a user can create a custom perspective of the content of the session. For example, the user can make annotations and add bookmarks to the session while the session is being recorded. The annotations can be added via a variety of mediums, such as voice, text, etc. These annotations are recorded as part of the session, and are indexed at a point in the session where the user inserted the annotations. Users may fast forward or rewind from that bookmarked point during review for faster access for required content. A collective index of all the bookmarks and annotations is created for easy searching and retrieval of particular sections of the session. The collective index can be made available to a user, for example, via a web page that includes the session, bookmarks, annotations and other information associated with the session. The individual entries (i.e., bookmarks, annotations, highlighted sections etc.) are displayed by selection on an entry, for example, a hyperlink on a web page. The annotations created by users can be identified as personal (for use by the user who added the annotations) or global for all users who have access to the session. During review of the session, the user can differentiate different portions of the session and create sub content sessions from the session.

The session can be reviewed via an interface such as a graphical user interface (i.e., on a computer, cell phone, telephone, etc.). In an example embodiment, the interface displays a status associated with each user participating in the session. The status can include, but is not limited to hold, mute, talking, dominant speaker, etc. The status can also indicate if a user, or group of users are sharing an application associated with the session. The interface may also display personal and global identifiers (indicating bookmarks/annotations, etc. that are for the user's personal use or for the user of all participants who have access to the session). In an example embodiment, global identifiers may be managed through permissions and policies. For example, the session managing process enables all users (i.e., session participants, reviewers, etc.) to view global identifiers (i.e., bookmarks, annotations, etc.). However, all participants may not have access to see all the other users' personal global identifiers. A user may grant other users viewing permissions for personal global identifiers.

In one embodiment, the session managing process identifies the content within the session attributed to each participant in the session. For example, the session management process identifies what each user said within a session and indexes that content so that the session can be searched for content provided by a particular user. This may be accomplished, for example, by associating a timestamp with each entry within the session.

The session managing process records a session on a medium, and differentiates the content of the session into a plurality of sub content sessions. The session managing process indexes the plurality of sub content sessions associated with the session, and allows retrieval of at least one of the plurality of sub content session based on the indexing. The session managing process provides a review of the session.

During an example operation of one embodiment, suppose a group of users, Alice, Bob and Caroline are having a meeting (i.e., a session). Alice is connected to the session via her computer, Bob is connected via his cell phone and Caroline is connected via a telephone. Alice, Bob and Caroline each have an interface with which to manage the session both during and after the session has completed. The session managing process may include Dual Tone Multi-Frequency (DTMF) detection. In other words, different digits on a device are associated with actions a user can perform on a session (i.e., bookmark, begin highlighting, stop highlighting, annotate with speech, etc.). Speech recognition technology may also be used to allow a user to perform an action on the session. As each person speaks, the session managing process identifies the speaker and distinguishes that person's contribution to the meeting from the contribution of the other two session participants. During the session, Bob selects 'hold' from his cell phone, and the session managing process transmits an update to each of the participants (via the interface) of the session to notify them that Bob's status has changed from 'active' to 'on hold'. During the session, Alice (or Bob or Caroline) chooses to highlight a section of the session by selecting start and stop markings on the session. These start and stop markings will be archived along with the session and will be indexed for easy retrieval at a future time. Alice can also add a comment to the session by, for example, adding a voice comment or adding a text comment. Alice can make these comments available only for her personal use or can identify those comments as globally available comments such that Bob or Caroline can also access those comments. Alice can also reverse (i.e., 'undo') the start and stop markings, the annotations, comments, etc. Alice may also see global comments that another user has associated with the session". After the session (or even during the session), Bob, Alice and/or Caroline can each access the session and add/modify/delete annotations, bookmarks, Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Avaya Inc. of Lincroft, N.J.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 illustrates an example review interface that allows a user to review the session.

FIG. 10 illustrates a flowchart of a procedure performed by the system of FIG. 1, when the session managing process allows retrieval of at least one of the plurality of sub content session based on the indexing, according to one embodiment disclosed herein.

DETAILED DESCRIPTION

Embodiments disclosed herein include a session managing process that allows a user to bookmark and annotate a session both during and after the recording of the session. The session managing process also stores the session, bookmarks and annotations together for easy retrieval. During a session, a user can create a custom perspective of the content of the session. For example, the user can make annotations and add bookmarks to the session while the session is being recorded. The annotations can be added via a variety of mediums, such as voice, text, etc. These annotations are recorded as part of the session, and are indexed at a point in the session where the user inserted the annotations. A collective index of all the bookmarks and annotations is created for easy searching and retrieval of particular sections of the session. The collective index can be made available to user, for example, via a web page that includes the session, bookmarks, annotations and other information associated with the session. The annotations created by users can be identified as personal (for use by the user who added the annotations) or global for all users who have access to the session. During review of the session, the user can differentiate different portions of the session and create sub content sessions from the session.

The session can be reviewed via an interface such as a graphical user interface (i.e., on a computer, cell phone, etc.). In an example embodiment, the interface displays a status associated with each user participating in the session. The status can include, but is not limited to hold, mute, talking, dominant speaker, etc. The status can also indicate if a user, or group of users are sharing an application associated with the session. The interface may also display personal and global identifiers (indicating bookmarks/annotations, etc. that are for the user's personal use or for the user of all participants who have access to the session).

In one embodiment, the session managing process identifies the content within the session attributed to each participant in the session. For example, the session management process identifies what each user said within a session and indexes that content so that the session can be searched for content provided by a particular user.

The session managing process records a session on a medium, and differentiates the content of the session into a plurality of sub content sessions. The session managing process indexes the plurality of sub content sessions associated with the session, and allows retrieval of at least one of the plurality of sub content session based on the indexing. The session managing process provides a review of the session.

Figure 1:
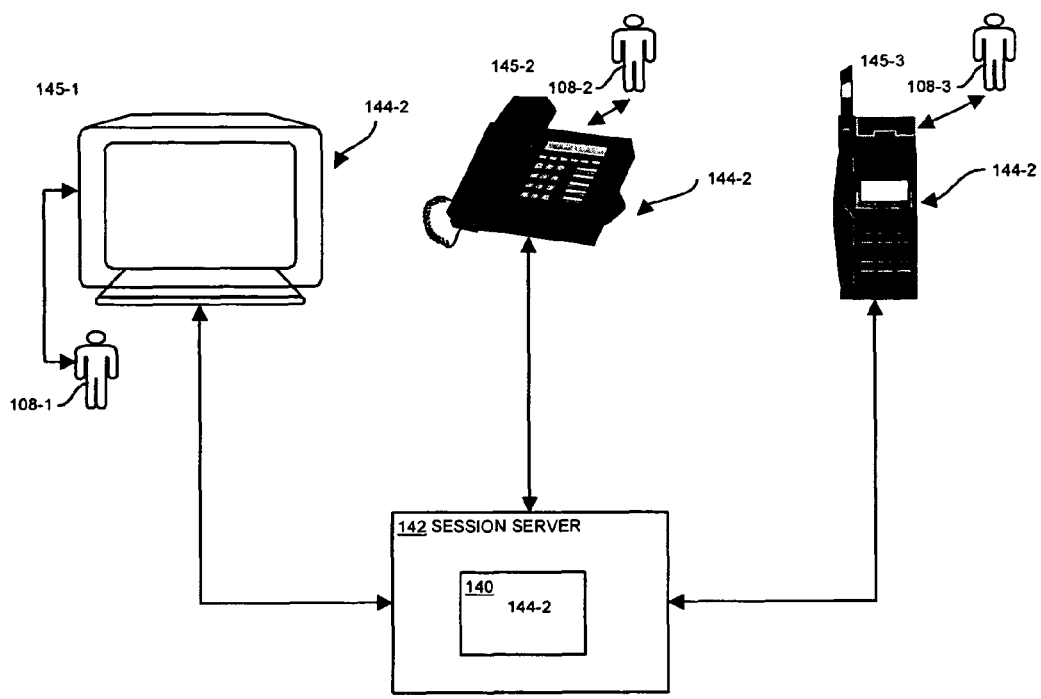
FIG. 1 shows a high level view of a system executing a session managing process according to one embodiment disclosed herein.
Figure 2:
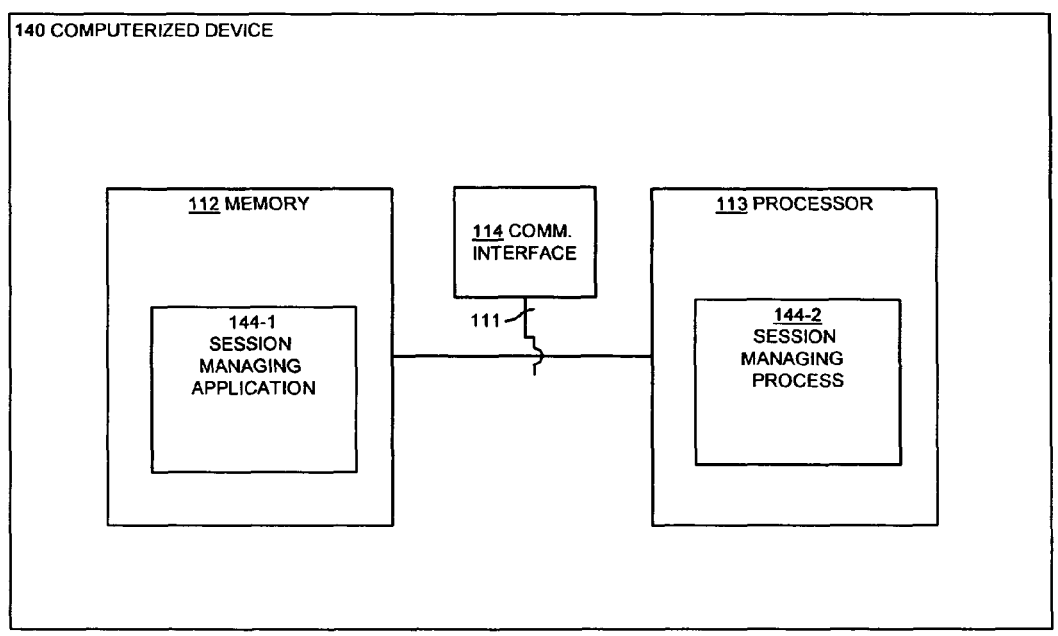
FIG. 2 shows a high-level block diagram of a computer system according to one embodiment disclosed herein

FIG. 1 is an example screenshot of high-level view of a system executing a session managing process according to one embodiment disclosed herein. Users 108 participate in a session via a session device 145-N, such as computer, cell phone, telephone, etc. Each session device 145-N is running an instance of the session managing process 144-2. As the users 108 participate in the session, the content of the session is transmitted to a session server 142. The session server 142 stores the content of the session and transmits the content back to the session devices 145-N such that the users 108 can interact with the content of the session as the session is occurring. The session server 142 is also running an instance of the session managing process 144-2, via, for example, a computerized device 140. FIG. 2 explains further details of the computerized device running an instance of the session managing process 144-2.

FIG. 2 illustrates an example architecture of a computer system 140. The computer system 140 may be any type of computerized device such as a personal computer, workstation, portable computing device, console, laptop, network terminal or the like. In this example, the computer system 140 includes an interconnection mechanism 111 that couples a memory system 112, a processor 113, and a communications interface 114. The communications interface 114 enables the computer system 140 to communicate with other devices (i.e., other computers) on a network (not shown). This can allow access to the session managing application by remote computer systems.

The memory system 112 may be any type of computer readable medium that is encoded with a session managing application 144-1 that may be embodied as software code such as data and/or logic instructions (e.g., code stored in the memory or on another computer readable medium such as a removable disk) that supports processing functionality according to different embodiments described herein. During operation of the computer system 140, the processor 113 accesses the memory system 112 via the interconnect 111 in order to launch, run, execute, interpret or otherwise perform the logic instructions of the session managing application 144-1. Execution of session managing application 144-1 in this manner produces processing functionality in a session managing process 144-2. In other words, the session managing process 144-2 represents one or more portions of runtime instances of the session managing application 144-1 (or the entire application 140-1) performing or executing within or upon the processor 113 in the computerized system 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Figure 3:
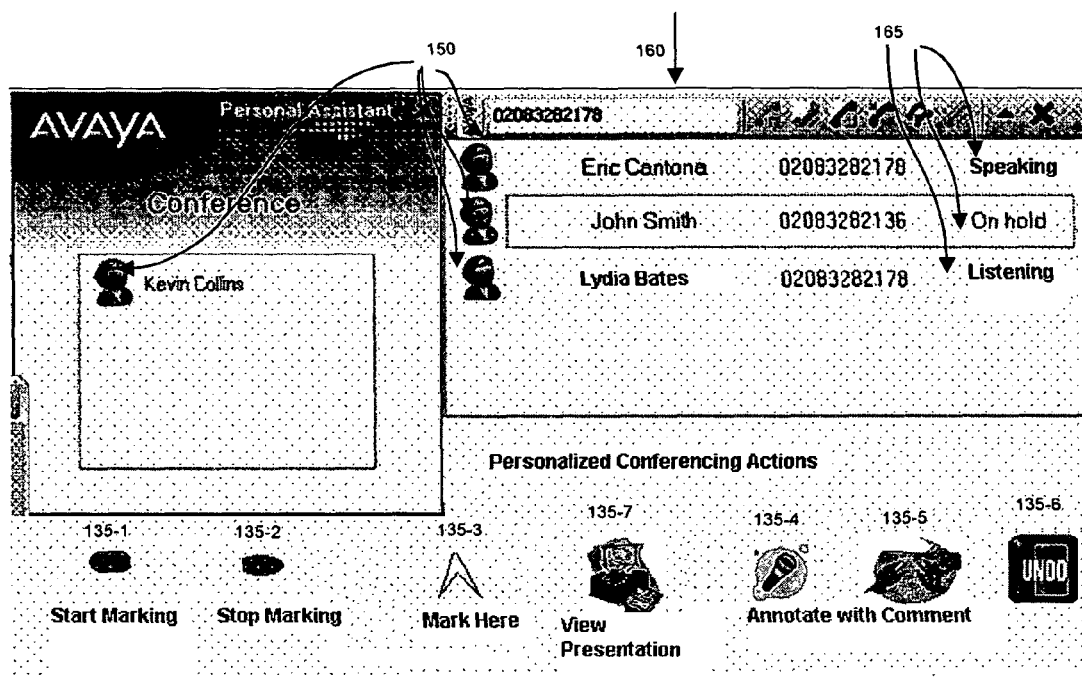
FIG. 3 illustrates an example screenshot of a session interface that allows a user to provide content to a session.

FIG. 3 illustrates an example screenshot of a session interface 160 that allows a user to provide content to a session. The session interface 160 provides buttons 135-N that allows a user 108 to provided content to a session. The session interface 160 can be, for example, a web page. The session interface 160 can be displayed, for example, on a computer, cell phone, etc. The session interface 160 displays icons 150 representing users 108, along with a status 165 associated with each user 108 participating in the session.

FIG. 4 illustrates an example review interface 130 that allows a user 108 to review the session. The review interface 130 displays an enhanced review of the session, including displaying a chronological review of the session. The chronological review also identifies the sub content sessions as personal or global (i.e., available to all users 108 having access to the session). A user 108 can bookmark sections of the session. The user can also mark sections of the session, including forwarding or rewinding sections of the session to select the appropriate point at which to mark the session. In an example embodiment, the user 108 can associate an identifier, such as a name, with a marked section of the session.

Further details of configurations explained herein will now be provided with respect to a flow chart of processing steps that show the high level operations disclosed herein to perform the content formatting process.

Figure 5:
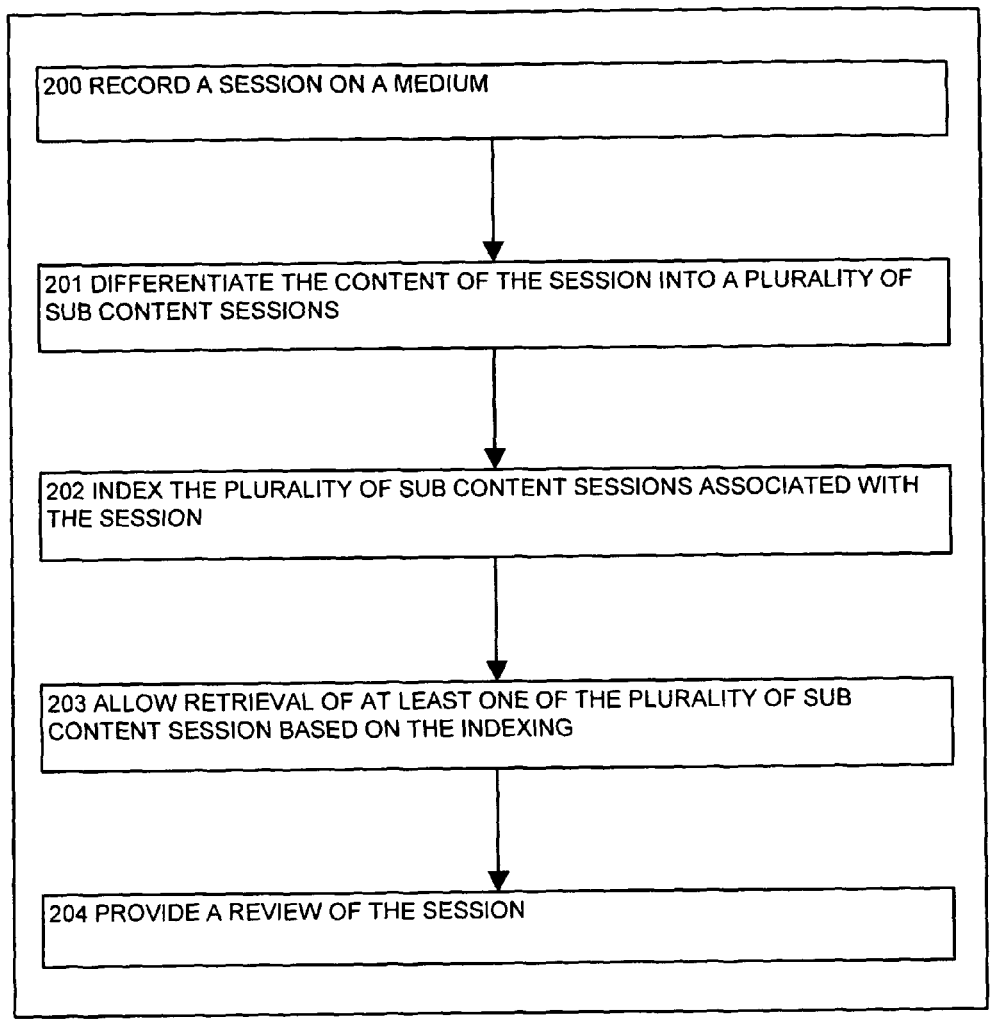
FIG. 5 illustrates a flowchart of a procedure performed by the system of FIG. 1, when the session managing process records a session on a medium, according to one embodiment disclosed herein.

FIG. 5 is an embodiment of the steps performed by the session managing process 140-2 when it records a session on a medium.

In step 200, the session managing process 144-2 records a session on a medium. The session could be, for example, a meeting between several users 108. The users 108 participating in the session may connect to the session via session devices 145-N, such as a telephone, cell phone, PDA, computer, etc. In another example embodiment, the users 108 may all be in the same room and choose to record the session using the session managing process 144-2.

In step 201, the session managing process 144-2 differentiates the content of the session into a plurality of sub content sessions. In an example embodiment, the session managing process 144-2 differentiates each of the different users 108 in the session, and identifies the dominant speaker at any given point during a session. The session managing process 144-2 identifies the contribution (to the session) of each of the users 108 participating in the session, and creates sub content sessions for the contributions associated with each user 108. In other words, the session managing process 144-2 identifies what each user 108 said during the session, and creates sub content sessions of these individual contributions such that the contributions of an individual user 108 can be reviewed, searched, etc. Sub content sessions can also include, for example, annotations, comments, etc, added to the session by a user 108.

In step 202, the session managing process 144-2 indexes the plurality of sub content sessions associated with the session. In an example embodiment, the session managing process 144-2 indexes the plurality of sub content sessions such that each of the plurality of sub content sessions is easily searchable, and retrievable. For example, the session managing process 144-2 indexes all of the sub content sessions related to what user 108 "Bob" said during the session. Contributions made to the session, whether made during the session or after the session, are indexed for future retrieval and review.

In step 203, the session managing process 144-2 allows retrieval of at least one of the plurality of sub content session based on the indexing. Thus, the index allows user 108 "Alice" to find all of the sub content sessions related to what user 108 "Bob" said during the session. User 108 "Alice" can retrieve these sub content sessions from the session server 142. In an example embodiment, user 108 "Alice" can also add annotations or comments, to the sub content sessions related to what user 108 "Bob" said during the session. These annotations, provided by user 108 "Alice", are also indexed as a sub content session and are further retrievable. User 108 "Alice" can mark the annotations (that she added) as personal or global (available to any user 108 who has access to the session).

In step 204, the session managing process 144-2 provides a review of the session. FIG. 4 illustrates an example review interface 130 that allows a user 108 to review the session. In this example, the review interface 130 provides chronological map of the content of the session. Each user's 108 contribution to the session is identified, as well as any additional content (such as bookmarking, annotations, comments, etc.) that a user 108 added to the session. The content of the session can be identified as global (i.e., available for any user 108 who has access to the session) or personal (i.e., available only to that user 108 who has added that content, for example, annotations and bookmarking made to the session). The review is made available to the users 108 via an interface, such as a graphical user interface. The interface is available to the users 108 via their computers, cell phones, etc. In an example embodiment, the review is made available to the users 108 on a web page.

Figure 6:
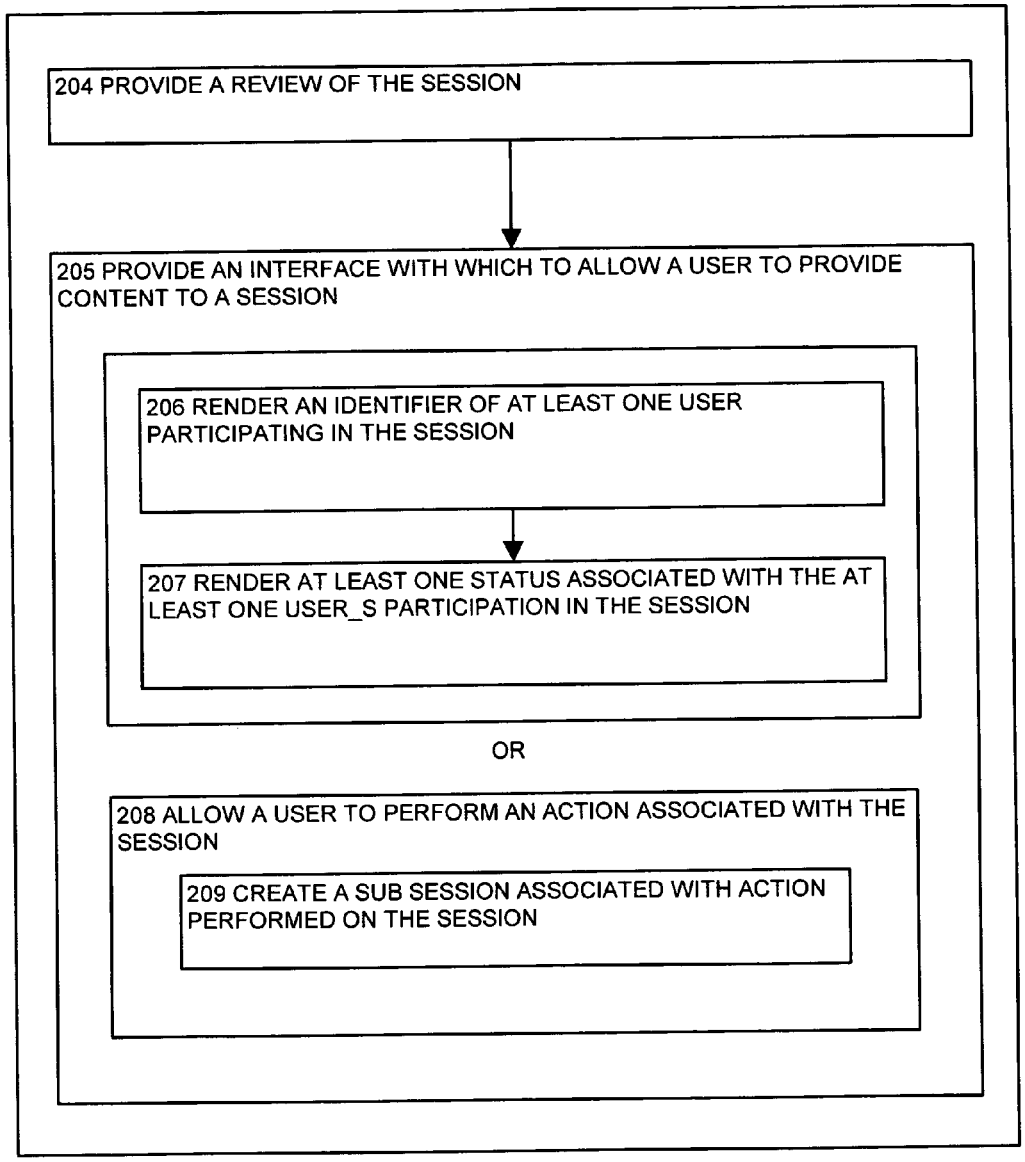
FIG. 6 illustrates a flowchart of a procedure performed by the system of FIG. 1, when the session managing process provides a review of the session, according to one embodiment disclosed herein.

FIG. 6 is a continuation of FIG. 5 of an embodiment of the steps performed by the session managing process 140-2 when it provides a review of the session.

In step 205, the session managing process 144-2 provides an interface with which to allow a user 108 to provide content to a session. FIG. 3 illustrates an example session interface 160 that allows a user 108 to provide content to a session. In this example, the session interface 160 provides buttons 135-N that allows a user 108 to provided content to a session. For example, a user 108 can select a Start Marking button 135-1 to begin marking a portion of the session (i.e., creating a sub content session), and a Stop Marking button 135-2 to end marking the portion of the session. The user 108 can select an Undo button 135-6 to remove content (i.e., annotations, comments, sections that were marked, etc.) added to the session. The user can add an annotation to the session, for example, by selecting a microphone icon 135-4 to add annotations by voice, or a keyboard icon 135-5 to add written comments to the session. The user 108 can attach content to the session, such as web pages, presentations, etc., to the session. The user can also view attached content, such as a presentation, by selecting a View Presentation button 125-7.

In step 206, the session managing process 144-2 renders an identifier of at least one user 108 participating in the session. In an example configuration, the session interface 160 identifies each user 108 participating in the session, and renders an identifier 150 to depict each of the users 108 participating. In an example embodiment, the session managing process 144-2 can provide additional information associated with each user 108, such as name, location, telephone number, which user 108 is currently speaking, etc.

In step 207, the session managing process 144-2 renders at least one status 165 associated with the at least one user's 108 participation in the session. For example, a user 108 may be actively participating in the session (whether by being present at the session or actively contributing to the session, such as speaking, etc.), or for example, on hold.

In an example embodiment, when a user 108 puts him or herself on hold, the session device 145-N transmits that information to the session server 142. The session server 142 then transmits that information to the session devices 145-N of the other users 108 participating in the session. The session managing process 144-2 then updates the interface(s) of the session devices 145-N of all the users 108 with this new information (i.e., that a user 108 placed him or herself on hold).

Alternatively, in step 208, the session managing process 144-2 allows a user 108 to perform an action associated with the session. FIG. 4 illustrates an example review interface 130 that allows a user 108 perform an action associated with the session. In this example, the review interface 130 allows a user to add a bookmark, add or delete an annotation, append an attachment, etc. The user 108 can select where in the session to, for example, add an annotation by forwarding through, or rewinding the session to locate the appropriate section in the session in which to add the annotation. The user 108 can perform this action during the session or after the session is completed.

In step 209, the session managing process 144-2 creates a sub content session associated with action performed on the session. In response to a user 108 performing an action on a session, for example, marking portions of the session or adding annotations, the session managing process 144-2 creates a sub content session based on those actions. For example, a user 108 adds an annotation to a session. The session managing process 144-2 creates a sub content session comprising the annotation, and indexes the annotation.

In another example embodiment, all of the user's 108 contributions (i.e., all that the user 108 'said' during the session) are identified and a sub content session is created out of that user's 108 contribution. The sub content session is indexed for future retrieval and review. Thus, the session can be searched for everything that user 108 "Alice" said during the session. A user 108, such as user 108 "Bob" can retrieve the sub content session (related to everything that user 108 "Alice" said during the session), and associate additional content to that sub session. For example, user 108 "Bob" may retrieve the sub content session related to everything that user 108 "Alice" said during the session and add the annotation, "We should explore this idea; this may be the key to resolving our latest set of problems". This annotation added by user 108 "Bob" is indexed and associated with the sub content session related to everything that user 108 "Alice" said during the session. Bob can identify this annotation as global, available to every user 108 who has access to the session.

Figure 7:
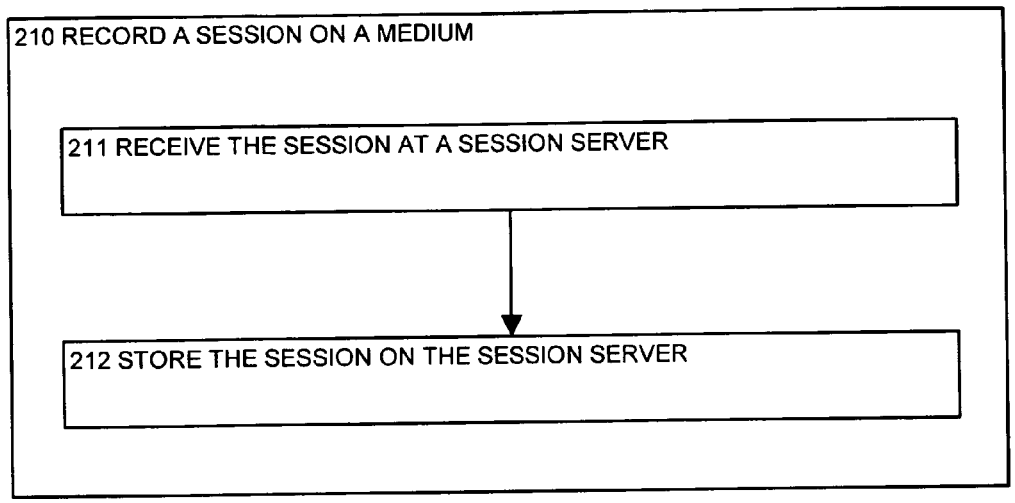
FIG. 7 illustrates a flowchart of a procedure performed by the system of FIG. 1, when the session managing process records a session on a medium, and receives the session at a session server, according to one embodiment disclosed herein.

FIG. 7 is an embodiment of the steps performed by the session managing process 140-2 when it records a session on a medium.

In step 210, the session managing process 144-2 records a session on a medium. The session could be, for example, a meeting between several users 108. The users 108 participating in the session may connect to the session via session devices 145-N, such as a telephone, cell phone, PDA, computer, etc.

In step 211, the session managing process 144-2 receives the session at a session server 142. As the session, and sub content sessions are created, modified and/or deleted, the sessions and sub content sessions are transmitted from the session devices 145-N used by the users 108 to the session server 142. In turn, the session server 142 updates the interfaces used by the users 108 with, for example, action performed on the session by the users 108 and content contributed to the session by the users 108.

In step 212, the session managing process 144-2 stores the session, and sub content sessions on the session server 142. The session, and sub content sessions are indexed, searchable, and retrievable. In an example embodiment, the session, and related sub content sessions are stored in a database in communication with the session server 142. The session and related sub content session are retrieved from the database, via database commands, such as Structured Query Language (SQL). The database may exist on the session server 142. The database may exist on a system separate from the session server 142 and may be accessed by the session server 142.

Figure 8:
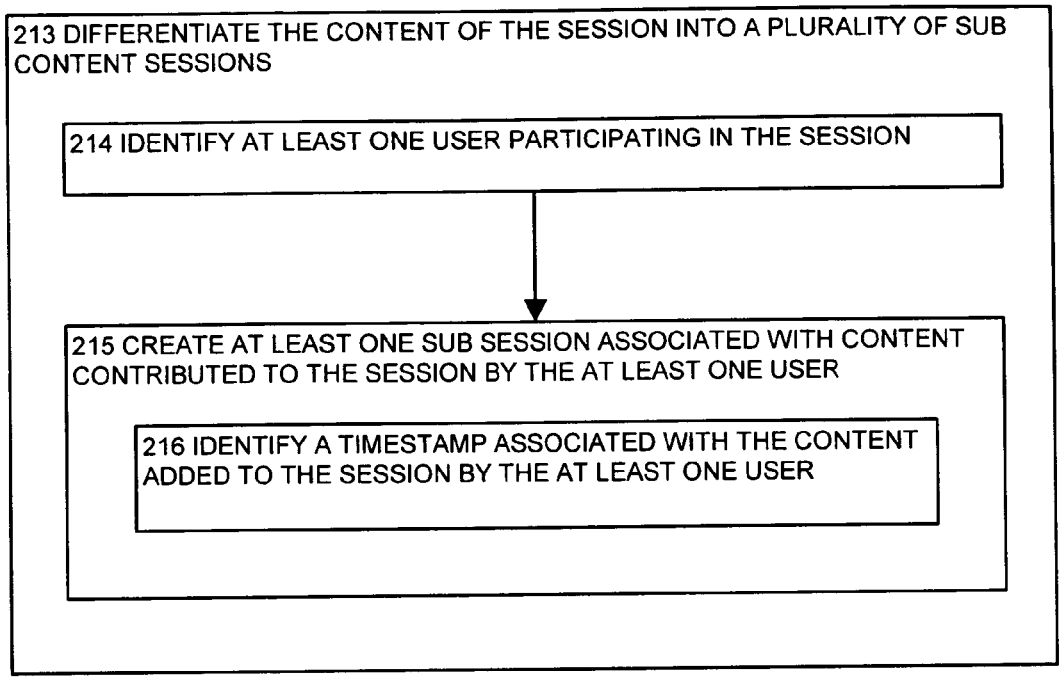
FIG. 8 illustrates a flowchart of a procedure performed by the system of FIG. 1, when the session managing process differentiates the content of the session into a plurality of sub content sessions, according to one embodiment disclosed herein.

FIG. 8 is an embodiment of the steps performed by the session managing process 140-2 when it differentiates the content of the session into a plurality of sub content sessions.

In step 213, the session managing process 144-2 differentiates the content of the session into a plurality of sub content sessions. The session managing process 144-2 identifies the contribution (to the session) of each of the users 108 participating in the session, and creates sub content sessions for the contributions associated with each user 108. For example, the session managing process 144-2 identifies a dominant user 108 in the session (i.e., the user 108 who is speaking). In an example embodiment, the session managing process 144-2 creates sub content sessions out of content added to the session by a user 108, such as annotations, attachments, bookmarks, etc.

In step 214, the session managing process 144-2 identifies at least one user 108 participating in the session. The user 108 participates in the session via a session device 145-N operating the session managing process 144-2. The user 108 may be participating in the session by phone, computer, etc.

In step 215, the session managing process 144-2 creates at least one sub content session associated with content contributed to the session by the user 108. As the user 108 contributes to the session (i.e., by speaking during the session, book marking portions of the session, adding attachments, annotations, comments to the session, etc.), sub content sessions are created, transmitted to and stored on the session server 142. In an example embodiment, the sub content sessions are created by the session managing process 144-2, operating on the session device 145-N. The sub content sessions are then transmitted to the session server 142. In another example embodiment, the contributions of the user 108 are transmitted (by the session managing process 144-2 operating on the session device 145-N) to the session server 142, and the session managing process 144-2, operating on the session server 142, creates sub content sessions from contributions, and stores the sub content sessions on the session server 142. The session managing process 144-2 then transmits the contributions of the user 108 to the session devices 145-N for display on the interfaces of the session devices 145-N.

In step 216, the session managing process 144-2 identifies a timestamp associated with the content added to the session by the user 108. As the user 108 adds content to the session, the position in the session at which the content is added to the session, is identified by a timestamp associated with the session at that moment.

In an example embodiment, the session managing process 144-2 identifies an application in use by the user 108 participating in the session. As the session managing process 144-2 identifies the content added to the session by the user 108, the session managing process 144-2 also identifies the application in use by the user 108 during the session and during the contribution to the session by the user 108.

Figure 9:
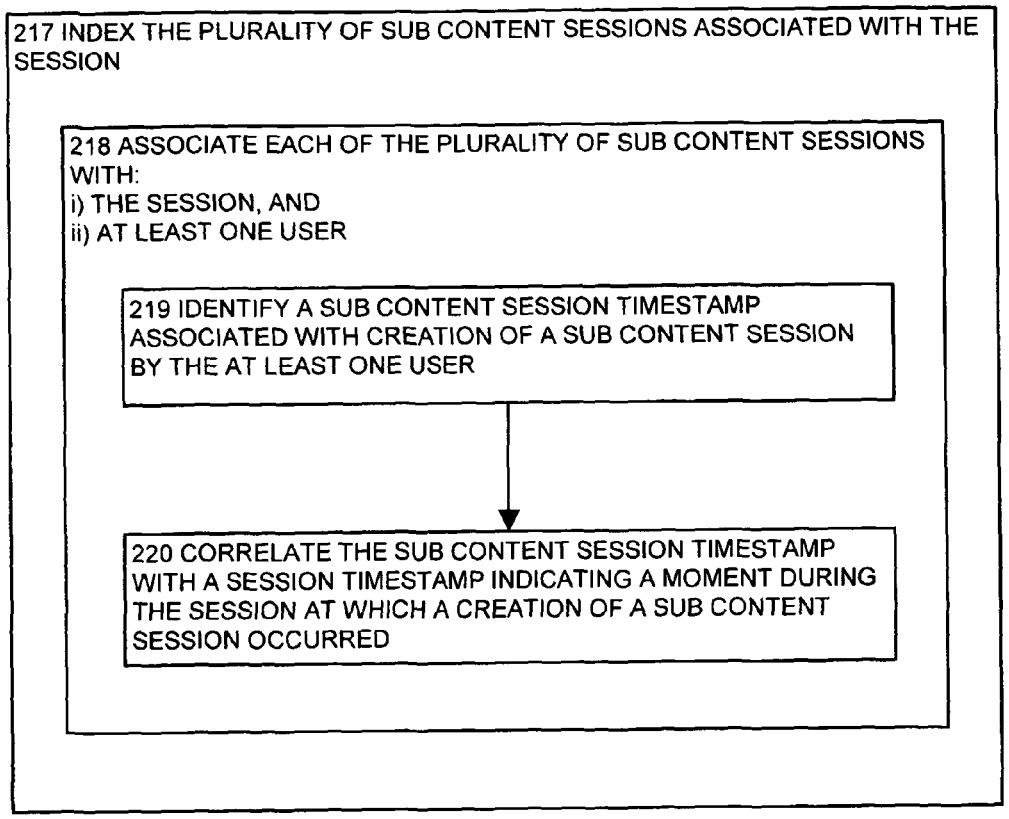
FIG. 9 illustrates a flowchart of a procedure performed by the system of FIG. 1, when the session managing process identifies a sub content session timestamp associated with creation of a sub content session by the at least one user, according to one embodiment disclosed herein.

FIG. 9 is an embodiment of the steps performed by the session managing process 140-2 when it indexes the plurality of sub content sessions associated with the session.

In step 217, the session managing process 144-2 indexes the plurality of sub content sessions associated with the session. The session managing process 144-2 indexes the plurality of sub content sessions such that each of the plurality of sub content sessions is easily searchable and retrievable. Sub content sessions can include annotations, comments, attachments, etc that a user 108 added to the session. Both during and after the session, a user 108 can search on the indexed sub content sessions. In an example embodiment, the user 108 can alter the content of the sub content sessions.

In step 218, the session managing process 144-2 associates each of the plurality of sub content sessions with the session, and at least one user 108. The sub content sessions are associated with the session based on the session, and the user 108 whose actions resulted in the creation of the sub content session. The session server 142 can store multiple session. The session managing process 144-2 each sub content session with the appropriate session and the user 108 who contributed or is associated with that sub content session.

In step 219, the session managing process 144-2 identifies a sub content session timestamp associated with creation of a sub content session by at least one user 108. At the moment a user 108 adds content to the session, the session managing process 144-2 captures a sub content session timestamp. In an example embodiment, the timestamp of the session device 145-N is synchronized with the session server 142 such that the session devices 145-N of all the users 108 are synchronized.

In step 220, the session managing process 144-2 correlates the sub content session timestamp with a session timestamp indicating a moment during the session at which a creation of a sub content session occurred. The session managing process 144-2 synchronizes the content added to the session by the user 108 with the content of the session by maintaining a time stamp associated with the session. Thus, a user 108 can retrieve, from the session server 142, all the content that occurred during the session at a particular point in time. The user 108 can also retrieve from the session server 142, any additional content (i.e., bookmarks, annotations, attachments, etc.) that are associated with the content at that particular time during the session.

FIG. 10 is an embodiment of the steps performed by the session managing process 140-2 when it allows retrieval of at least one of the plurality of sub content session based on the indexing.

In step 221, the session managing process 144-2 allows retrieval of at least one of the plurality of sub content session based on the indexing. The content of the session, and any additional content provided by a user 108 are indexed by the session managing process 144-2. The indexed content can be stored on the session server 142, searched upon and retrieved.

In step 222, the session managing process 144-2 receives a request to retrieve at least one of the plurality of sub content session from a session server 142. For example, a user 108 may request everything that user 108 "Caroline" said during the session. A user 108 may request all the annotations that user 108 "Bob" added to the session. A user 108 may request all the attachments that all users 108 appended to the session.

In step 223, the session managing process 144-2 transmits a copy of the plurality of sub content session from the session server 142 for display to at least one user 108. The session managing process 144-2 retrieves a copy of a user's 108 contribution (i.e., everything that user 108 "Caroline" said during the session) from the session server 142, and transmits a copy of the user's 108 contribution to a user 108 (i.e., either the same user 108 "Caroline", a different user 108 "Alice" or a group of users 108 "Bob, Alice and Caroline"). The user(s) 108 view a copy of a user's 108 contribution via an interface, for example, a session interface 160 or a review interface 130. In an example embodiment, the copy of a user's 108 contribution is made available on a web page such that users 108 may access the web page, the contribution and any attachments associated with the session and/or contribution.

Alternatively, in step 224, the session managing process 144-2 receives at least one of the plurality of sub content session at a session server 142. At least one of the plurality of sub content session is identified as a global sub content session. A user 108 adding annotations, book marking, etc to a session can identify that content as personal (i.e., only for use/viewing by the user 108), or global, (i.e., for use/viewing by all users 108 who have access to the session). During the creation of the session (i.e., during the time the meeting is occurring), the contributions of the user 108 (i.e., what each user 108 says during the session) are identified as global sub content session, available to every user 108 who has access to the session. Additionally, annotations, bookmarks, etc., added to the session by a user 108, can be identified (by that user 108) as personal or global.

In step 225, the session managing process 144-2 propagates the global sub content session to at least one user 108 identified as a recipient of the global sub content session. In an example embodiment, a user 108 adds an annotation to the session, and marks the annotation as a global sub content session. The global sub content session is transmitted to the session server 142 where the global sub content session is propagated to all users 108 who are identified as recipients of global sub content sessions associated with this session.

Figure 11:
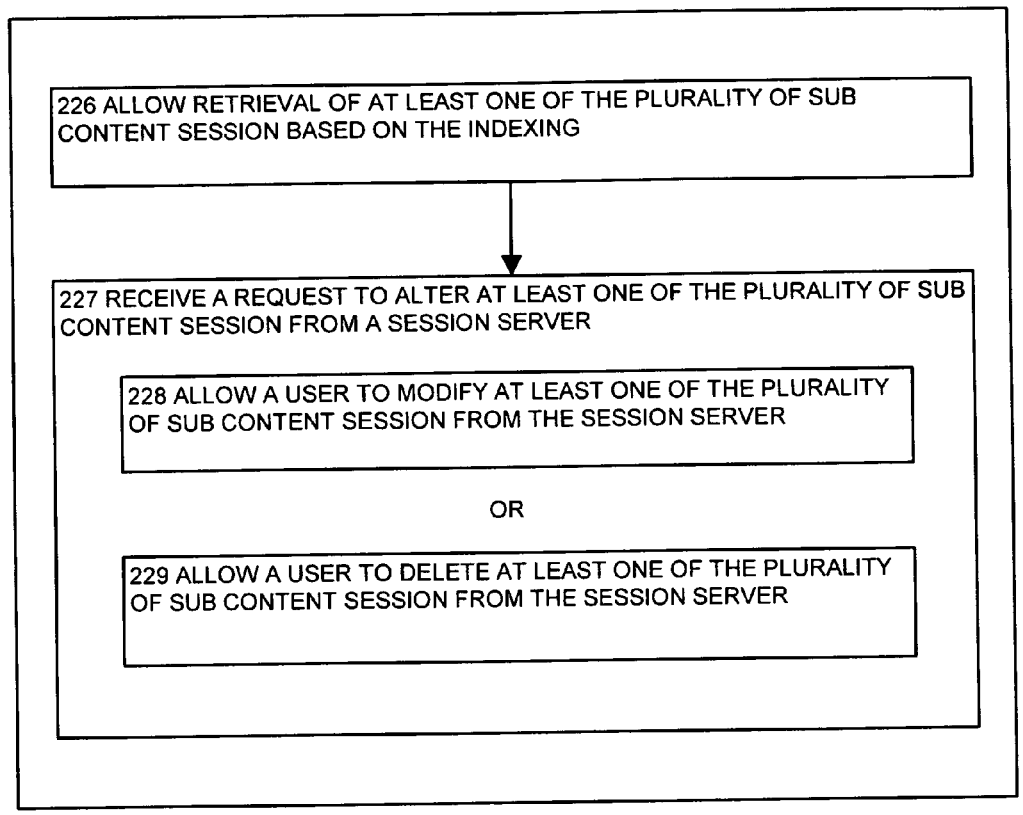
FIG. 11 illustrates a flowchart of a procedure performed by the system of FIG. 1, when the session managing process allows retrieval of at least one of the plurality of sub content session based on the indexing, and receives a request to alter at least one of the plurality of sub content session from a session server, according to one embodiment disclosed herein.

FIG. 11 is an embodiment of the steps performed by the session managing process 140-2 when it allows retrieval of at least one of the plurality of sub content session based on the indexing.

In step 226, the session managing process 144-2 allows retrieval of at least one of the plurality of sub content session based on the indexing. The session, and plurality of sub content sessions are stored on the session server 142, for example, in a database. The session, and plurality of sub content sessions can be retrieved from the database.

In step 227, the session managing process 144-2 receives a request to alter at least one of the plurality of sub content session from a session server 142. In an example embodiment, a user 108 has marked a portion of the session, and added an annotation to the marked portion of the session (thereby creating a sub content session comprising the marked portion and the annotation). The user 108 wishes to alter that sub content session, and performs a request to retrieve that sub content session from the session server 142. The user can change, or delete the annotation. The user can also add additional annotations, etc.

In step 228, the session managing process 144-2 allows a user 108 to modify at least one of the plurality of sub content session from the session server 142. The user 108 is able to modify a sub content session. For example, during the creation of the session (i.e., during the time the meeting/session was occurring), the user 108 added an annotation. The user 108 may retrieve the annotation and modify that annotation. The modified annotation is transmitted to, indexed, and stored on the session server 142.

Alternatively, in step 229, the session managing process 144-2 allows a user to delete at least one of the plurality of sub content session from the session server 142. For example, a user 108 may delete an annotation added to the session (thereby also deleting the sub content session that was created as a result of the added annotation). The user 108 may also remove start marking and stop marking additions to the session.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of providing processing of a session, the method comprising:
   recording a session on a medium;
   differentiating the content of the session into a plurality of sub content sessions;
   indexing the plurality of sub content sessions associated with the session; and
   allowing retrieval of at least one of the plurality of sub content session based on the indexing;
   wherein differentiating the content of the session into a plurality of sub content sessions includes:
      identifying first content representative of a first session participant's activity during a live session, wherein the first content comprises a first sub content session; and
      identifying second content representative of a second session participant's activity during the live session, wherein the second content comprises a second sub content session;
   wherein allowing retrieval of at least one of the plurality of sub content session based on the indexing includes:
      after a conclusion of the live session, receiving a first request for the first content, the request received from the second session participant; and
      providing the second session participant access to the first content, the first content including a first annotation created by the first session participant, wherein providing the second session participant access to the first content includes: providing access to the first annotation, wherein the first annotation was created after the live session.

2. The method of claim 1 comprising:
   providing a review of the session, wherein providing a review of the session comprises:
   providing an interface with which to allow a user to provide content to a session.

3. The method of claim 2 wherein providing an interface with which to allow a user to provide content to a session comprises:

rendering an identifier of at least one user participating in the session; and
rendering at least one status associated with the at least one user's participation in the session.

4. The method of claim 2 wherein providing an interface with which to allow a user to provide content to a session comprises: allowing a user to perform an action associated with the session, wherein allowing a user to perform an action associated with the session comprises: creating a sub content session associated with action performed on the session.

5. The method of claim 1 wherein recording a session on a medium comprises:
receiving the session at a session server; and
storing the session on the session server.

6. The method of claim 1 wherein differentiating the content of the session into a plurality of sub content sessions comprises:
identifying at least one user participating in the session;
creating at least one sub content session associated with content contributed to the session by the at least one user, wherein creating at least one sub content session associated with content contributed to the session by the at least one user comprises:
identifying a timestamp associated with the content added to the session by the at least one user.

7. The method of claim 1 wherein indexing the plurality of sub content sessions associated with the session comprises:
associating each of the plurality of sub content sessions with:
i) the session; and
ii) at least one user.

8. The method of claim 7 wherein associating each of the plurality of sub content sessions with the session and the at least one user comprises:
identifying a sub content session timestamp associated with creation of a sub content session by the at least one user; and
correlating the sub content session timestamp with a session timestamp indicating a moment during the session at which a creation of a sub content session occurred.

9. The method of claim 1 wherein allowing retrieval of at least one of the plurality of sub content session based on the indexing comprises:
receiving a request to retrieve at least one of the plurality of sub content session from a session server; and
transmitting a copy of the at least one of the plurality of sub content session from the session server for display to at least one user.

10. The method of claim 1 wherein allowing retrieval of at least one of the plurality of sub content session based on the indexing comprises:
receiving at least one of the plurality of sub content session at a session server, the at least one of the plurality of sub content session identified as a global sub content session;
propagating the global sub content session to at least one user identified as a recipient of the global sub content session.

11. The method of claim 1 wherein allowing retrieval of at least one of the plurality of sub content session based on the indexing comprises:
receiving a request to alter at least one of the plurality of sub content session from a session server' and
allowing a user to modify at least one of the plurality of sub content session from the session server.

12. The method of claim 1, wherein allowing retrieval of at least one of the plurality of sub content session based on the indexing comprises:
receiving a request to alter at least one of the plurality of sub content session from a session server; and
allowing a user to delete at least one of the plurality of sub content session from the session server.

13. The method as in claim 1, comprising:
receiving a second annotation from the second session participant;
updating the first content to include the second annotation; and
upon receiving a second request for the first content from a third session participant, providing the third session participant access to the updated first content, the updated first content including the first annotation and the second annotation.

14. The method as in claim 13, wherein providing access to the first annotation comprises: providing access to a portion of text data associated with a period of time from the live session, the period of time selected by the first session participant.

15. The method as in claim 13, wherein providing access to the first annotation comprises: providing access to a portion of video data associated with a period of time from the live session, the period of time selected by the first session participant.

16. The method as in claim 1, wherein identifying first content representative of the first session participant's activity during the live session includes:
identifying real-time speech data provided by the first session participant during the live session;
identifying at least one annotation created by the first session participant during the live session;
receiving a selection of at least one moment of time from the live session; and
associating the annotation with the at least one moment of time.

17. A computerized device comprising:
a memory;
a processor;
a communications interface;
an interconnection mechanism coupling the memory, the processor and the communications interface;
wherein the memory is encoded with a session managing application that when executed on the processor is capable of managing a session on the computerized device by performing the operations of:
recording a session on a medium;
differentiating the content of the session into a plurality of sub content sessions;
indexing the plurality of sub content sessions associated with the session; and
allowing retrieval of at least one of the plurality of sub content session based on the indexing;
wherein differentiating the content of the session into a plurality of sub content sessions includes:
identifying first content representative of a first session participant's activity during a live session, wherein the first content comprises a first sub content session; and
identifying second content representative of a second session participant's activity during the live session, wherein the second content comprises a second sub content session;
wherein allowing retrieval of at least one of the plurality of sub content session based on the indexing includes:

after a conclusion of the live session, receiving a first request for the first content, the request received from the second session participant; and providing the second session participant access to the first content, the first content including a first annotation created by the first session participant, wherein providing the second session participant access to the first content includes: providing access to the first annotation, wherein the first annotation was created after the live session.

18. The computerized device of claim 17 wherein the computerized device is capable of performing the operation of:

providing a review of the session, wherein when the computerized device performs the operation of providing a review of the session the computerized device is capable of performing the operation of:

providing an interface with which to allow a user to provide content to a session.

19. A non-transitory computer readable storage medium encoded with computer programming logic that when executed on a process in a computerized device provides session management, the medium comprising:

instructions for recording a session on a medium;

instructions for differentiating the content of the session into a plurality of sub content sessions;

instructions for indexing the plurality of sub content sessions associated with the session; and instructions for allowing retrieval of at least one of the plurality of sub content session based on the indexing;

wherein the instructions for differentiating the content of the session into a plurality of sub content sessions include:

instructions for identifying first content representative of a first session participant's activity during a live session, wherein the first content comprises a first sub content session; and instructions for identifying second content representative of a second session participant's activity during the live session, wherein the second content comprises a second sub content session;

wherein the instructions for allowing retrieval of at least one of the plurality of sub content session based on the indexing include:

instructions for receiving, after a conclusion of the live session, a first request for the first content, the request received from the second session participant; and instructions for providing the second session participant access to the first content, the first content including a first annotation created by the first session participant wherein the instructions for providing the second session participant access to the first content include: instructions for providing access to the first annotation, wherein the first annotation was created after the live session.

* * * * *